US012397564B2

(12) United States Patent
Shima et al.

(10) Patent No.: US 12,397,564 B2
(45) Date of Patent: Aug. 26, 2025

(54) PRINTING APPARATUS AND CONTROL METHOD THEREOF

(71) Applicant: CANON KABUSHIKI KAISHA, Tokyo (JP)

(72) Inventors: Takaaki Shima, Kanagawa (JP); Kazuki Narumi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 145 days.

(21) Appl. No.: 18/337,612

(22) Filed: Jun. 20, 2023

(65) Prior Publication Data

US 2024/0017556 A1  Jan. 18, 2024

(30) Foreign Application Priority Data

Jul. 5, 2022  (JP) ................. 2022-108457

(51) Int. Cl.
*B41J 11/00* (2006.01)
*B41J 2/21* (2006.01)

(52) U.S. Cl.
CPC ......... *B41J 11/0022* (2021.01); *B41J 2/2107* (2013.01)

(58) Field of Classification Search
CPC .... B41J 11/0022; B41J 2/2107; B41J 2/2114; G06K 15/021
See application file for complete search history.

(56) References Cited

U.S. PATENT DOCUMENTS 9,987,858 B2 * 6/2018 Perez Gellida ........ B41J 29/377

* cited by examiner

*Primary Examiner* — Bradley W Thies
(74) *Attorney, Agent, or Firm* — Venable LLP

(57) ABSTRACT

A printing apparatus includes a print head that applies ink to a print medium; a conveyance unit that conveys a print medium in a conveying direction; a first drying means that is disposed downstream relative to the print head in the conveying direction, and dries ink applied to the print medium by blowing gas such that an angle formed with the conveying direction is a first angle; and a second drying means that is disposed downstream relative to the first drying means in the conveying direction, and dries ink applied to the print medium by blowing gas such that an angle formed with the conveying direction is a second angle different from the first angle.

12 Claims, 9 Drawing Sheets

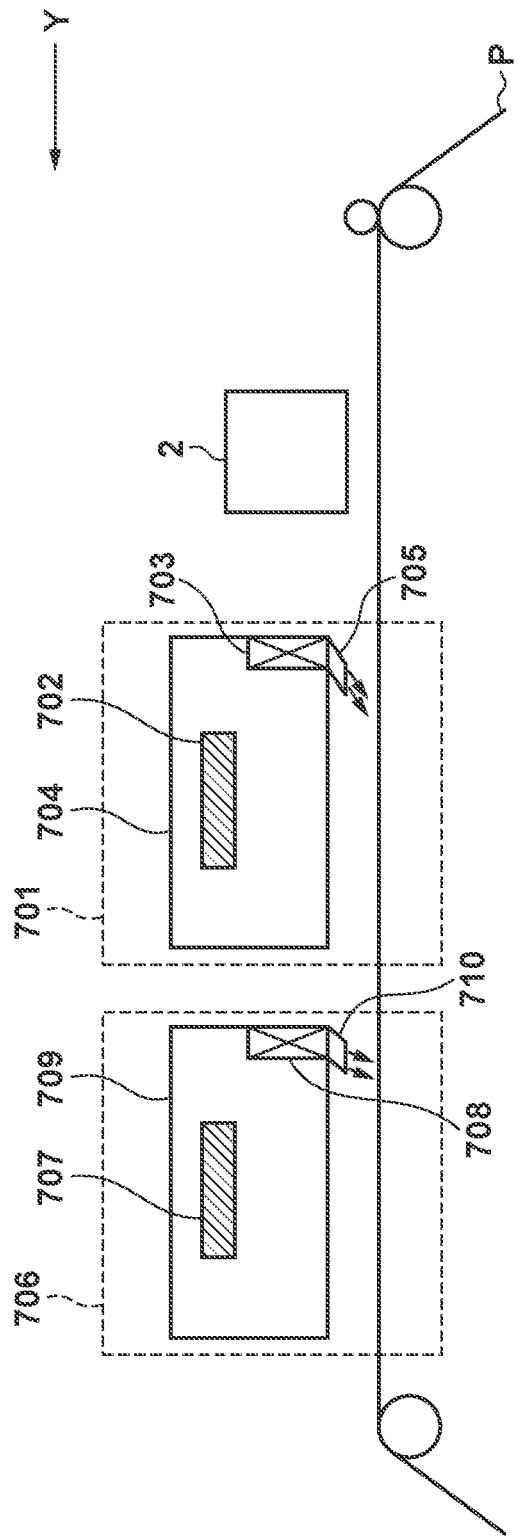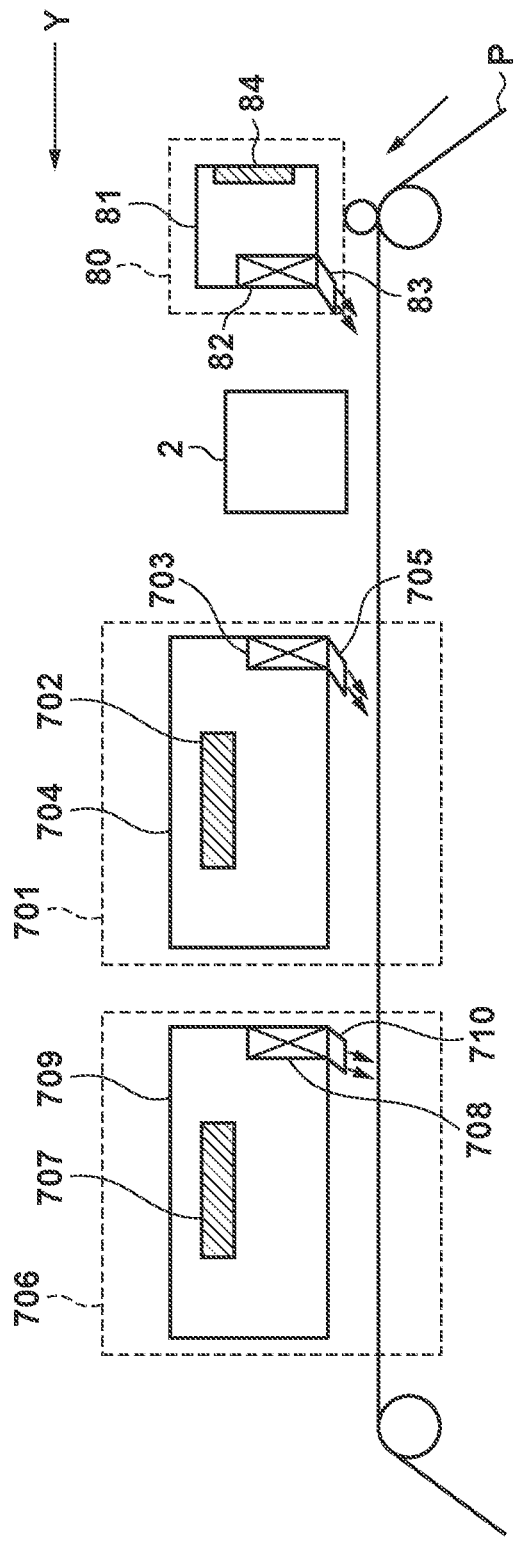

PRINTING APPARATUS AND CONTROL METHOD THEREOF

BACKGROUND OF THE INVENTION

Field of the Invention

The present invention relates to a printing apparatus that ejects ink to form an image.

Description of the Related Art

In recent years, an inkjet printing apparatus using a pigment ink has been able to achieve both high color developability comparable to that of a dye ink and image fastness indicating image intensity, long-term preservability, and the like due to advances in the manufacturing technology. For this reason, the inkjet printing apparatus has been widely spread to public posting use such as outdoor posters, POP posters, facility signs, and displays, in addition to photograph use for which a printed image is highly required to be stored for a long period of time. In such a large-sized use of a print image, there is a high demand for high productivity. Furthermore, in order to reduce the printing cost of a small number of copies of various types, there is an increasing demand for inkjet printing on a polyvinyl chloride sheet (hereinafter, referred to as vinyl chloride sheet) used for actual printing paper, wallpaper, tarpaulin, and the like, which are printing coated paper in commerce or publication.

In general, unlike dedicated inkjet paper or plain paper having a surface provided with a receiving layer excellent in permeability to aqueous ink used in an inkjet printing apparatus, a vinyl chloride sheet or the like used for printing of wallpapers or the like does not have permeability to the aqueous ink. When ink droplets remain in a liquid state for a long time on such a print medium, it causes a problem that image impairment remarkably appears. Therefore, as a printing method onto a print medium having low or no ink permeability to the aqueous ink, a method such as blowing or heating is used in order to promote evaporation of a solvent such as water of ink droplets on the print medium and fix a color material on the print medium surface.

In a method of drying by heating, in order to increase printing speed and increase productivity, it is necessary to evaporate in a short time an organic solvent that is less likely to evaporate than water. Therefore, a configuration in which a heated gas is blown against the print medium at a relatively high air speed is generally known. When this method is used, if the ink is not sufficiently thickened before hot air is blown, there is a risk that the smoothness of the ink film surface is disturbed and the glossiness decreases.

Setting the temperature of the heated gas to be high can increase the drying efficiency, but causes a problem of damage such as when the print medium is entirely expanded and contracted or partially expanded and contracted and waved, and a problem of an increase in power consumption. Setting the drying time to be long by slowing the printing speed fails to satisfy the productivity required in printing for public posting use, and in order to satisfy the productivity, it is necessary to increase the size of the apparatus.

In order to maintain print quality even in a low temperature environment, U.S. Pat. No. 9,987,858 proposes a configuration of an inkjet printing apparatus that heats a print medium with heated air in a print zone where ink is applied, and uses another heating and drying means after the ink is applied.

Since the technique described in U.S. Pat. No. 9,987,858 includes drying by heated air in the print zone, evaporation and thickening of the ink are promoted before the heating and drying stage at the downstream, and the influence of decreasing the glossiness is mitigated. On the other hand, since the ink droplets evaporate, thicken, and solidify immediately after landing on the print medium, the ink droplets are less likely to be smoothed, and therefore there is concern of a decrease in smoothness of the ink film surface and a decrease in glossiness of the image.

SUMMARY OF THE INVENTION

The present invention has been made in view of the above-described problems, and provides a printing apparatus that can suppress a decrease in glossiness of a printed image surface even in printing onto a material having low ink absorbability.

According to a first aspect of the present invention, there is provided a printing apparatus comprising: a print head that applies ink to a print medium; a conveyance unit that conveys a print medium in a conveying direction; a first drying means that is disposed downstream relative to the print head in the conveying direction, and dries ink applied to the print medium by blowing gas such that an angle formed with the conveying direction is a first angle; and a second drying means that is disposed downstream relative to the first drying means in the conveying direction, and dries ink applied to the print medium by blowing gas such that an angle formed with the conveying direction is a second angle different from the first angle.

According to a second aspect of the present invention, there is provided a method of controlling a printing apparatus including a print head that applies ink to a print medium, and a conveyance unit that conveys a print medium in a conveying direction, the method comprising: a first drying of drying ink applied to the print medium by blowing gas such that an angle formed with the conveying direction is a first angle by a first drying means disposed downstream relative to the print head in the conveying direction; and a second drying of drying ink applied to the print medium by blowing gas such that an angle formed with the conveying direction is a second angle different from the first angle by a second drying means disposed downstream relative to the first drying means in the conveying direction.

Further features of the present invention will become apparent from the following description of exemplary embodiments with reference to the attached drawings.

BRIEF DESCRIPTION OF THE DRAWINGS

FIG. 8 is a schematic diagram of a heating unit in a first embodiment.

FIG. 9 is a schematic diagram of a heating unit in a second embodiment.

DESCRIPTION OF THE EMBODIMENTS

Figure 1:
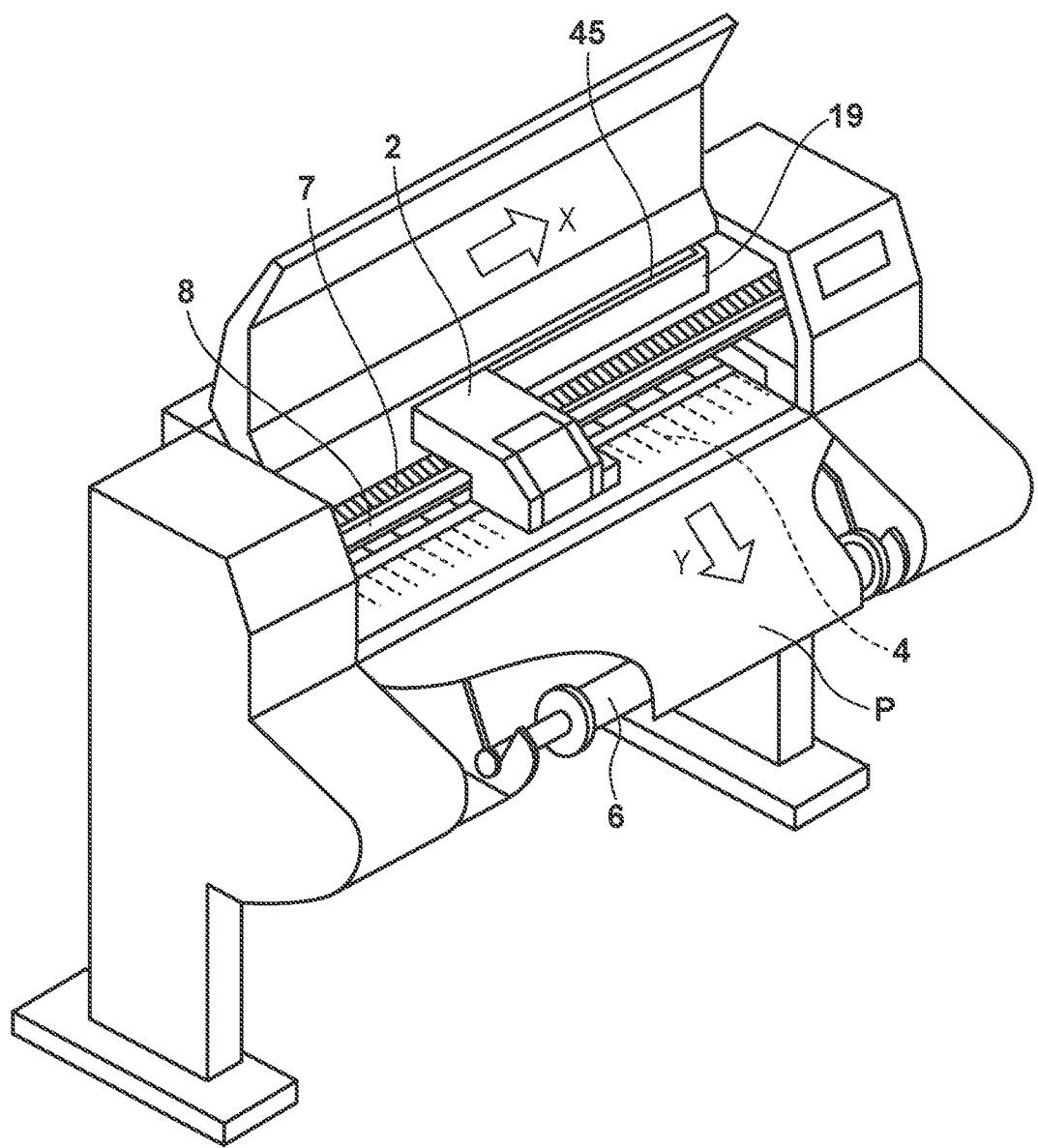
FIG. 1 is a view for explaining an appearance of an inkjet printing apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

A printing apparatus using an inkjet printing method that is the first embodiment of a printing apparatus of the present invention will be described below. The printing apparatus of the present embodiment may be a single function printer having only a printing function, for example, or may be a multi function printer having a plurality of functions such as a printing function, a FAX function, and a scanner function, for example. For example, the printing apparatus may be a manufacturing apparatus for manufacturing a color filter, an electronic device, an optical device, a small structure, or the like by a predetermined printing method.

Note that in the following description, "printing" does not only mean a case of forming meaningful information such as characters and figures but means anything regardless of being meaningful or not. Furthermore, it does not matter either whether or not to be actualized so as to be visually perceptible by a human, and "printing" also represents a case of widely forming an image, a mark, a pattern, a structure, or the like on a print medium P or processing a medium.

The "print medium" represents not only paper used in a general printing apparatus but also those that can accept ink, such as cloth, a plastic film, a metal plate, glass, ceramics, resin, wood, and leather. In particular, the "non-permeable print medium/low-permeable print medium" is a non-absorbent print medium/low-absorbent print medium. Examples of non-permeable print medium include those that are not fabricated as a print medium for aqueous inkjet ink, such as glass, plastic, film, and polypropylene-based synthetic paper (YUPO paper). Examples of non-permeable print medium include those that are not subjected to surface treatment for inkjet printing (that is, an ink absorption layer is not formed), for example, a base such as a plastic film or paper is coated with plastic. Examples of plastic include polyvinyl chloride, polyethylene terephthalate, polycarbonate, polystyrene, polyurethane, polyethylene, and polypropylene. Specific examples of low-permeable print medium include print media such as actual printing paper used for offset printing such as art paper and coated paper.

The actual printing paper (poorly absorbent print medium) in which the permeability of aqueous ink is very low compared with the dedicated inkjet paper will be described. The actual printing paper is a formal (genuine) printing paper used for actual printing in offset printing when a product (commodity) is made. Paper is made from pulp as a raw material. The paper used in a state as it is uncoated paper, and the paper whose surface is smoothly coated with a white pigment or the like is coated paper. This coated paper remarkably exhibits image impairment and drying impairment due to ink overflow in inkjet printing. A coated layer is obtained by coating about several g to 40 g/m$^2$ of a mixed coating material such as a sizing agent (synthetic resin or the like) that limits liquid absorbability in a gap between pulps and prevents bleeding of an aqueous pen, a filler (kaolin or the like) that improves opacity, whiteness, smoothness, and the like, and a paper strength additive (starch or the like). The radius of the average capillary hole of the coated paper is normally distributed around 0.06 µm and moisture is permeated by a large number of capillaries (capillary phenomenon). However, the pore volume is so small as compared with the dedicated inkjet paper that the permeability of aqueous ink is low, and the ink overflows on the paper surface, and image impairment and drying impairment remarkably appear.

A vinyl chloride sheet having no permeability of aqueous ink compared with dedicated inkjet paper will be described. The vinyl chloride sheet is a soft sheet manufactured by adding a plasticizer to a vinyl chloride resin as a main raw material. It is excellent in print performance in gravure printing, screen printing, and the like and emboss performance (irregular pattern by embossing). These combinations enable various expressions, and thus are used for many products such as tarpaulin, canvas, and wallpaper. Since a vinyl chloride resin is the main raw material, there is no permeability of aqueous ink at all, and the ink overflows on the surface of the sheet, and the ink overflows on the paper surface, and image impairment and drying impairment remarkably appear.

Other examples include those that are not fabricated as a print medium for aqueous inkjet ink, such as glass, plastic, film, and polypropylene-based synthetic paper (YUPO paper). Examples of non-permeable print medium include those that are not subjected to surface treatment for inkjet printing (that is, an ink absorption layer is not formed), for example, a base such as a plastic film or paper is coated with plastic. Examples of plastic include polyvinyl chloride, polyethylene terephthalate, polycarbonate, polystyrene, polyurethane, polyethylene, and polypropylene.

Furthermore, the "ink" should be interpreted broadly similarly to the definition of the "printing". Therefore, it represents a liquid that can be applied onto a print medium to be used for formation of an image, a mark, a pattern, or the like, processing of the print medium, or treatment of ink (for example, solidification or insolubilization of the colorant in the ink applied to the print medium P).

Overall Configuration

FIG. 1 illustrates an appearance of an inkjet printing apparatus (hereinafter, also referred to as printing apparatus or printer) 100 of the present embodiment. This is what is called a serial scanning type printer, and is configured to print an image by scanning a print head in an X direction (scanning direction) orthogonal to a Y direction (conveying direction) of the print medium P.

An outline of the configuration of the printing apparatus 100 and an operation at the time of printing will be described with reference to FIG. 1.

First, the print medium P is conveyed in the Y direction from a spool 6 holding the print medium P by a conveyance roller driven by a conveyance motor (not illustrated) via a gear. On the other hand, at a predetermined conveyance position, a carriage motor 310 (see FIG. 3) reciprocally scans (reciprocates) a carriage unit 2 along a guide shaft 8 extending in the X direction. Then, in this scanning process, an ejection operation is performed from an ejection orifice of a print head 9 (see FIG. 3) mounted on the carriage unit 2 at a timing based on a position signal obtained by an encoder 7, and a constant bandwidth corresponding to an array range of the ejection orifice is printed. The scan speed is variable, and scanning at 10 to 70 inches per second is possible. The printing resolution is also variable, and the ejection operation can be performed at 300 to 2400 Dpi. After the above-described scanning, the print medium P is conveyed, and printing is performed for the next bandwidth.

A carriage belt can be used to transmit the driving force from the carriage motor 310 to the carriage unit 2. However, instead of the carriage belt, it is also possible to use another driving method such as a method including, for example, a lead screw that is rotationally driven by the carriage motor 310 and extends in the X direction and an engaging portion that is provided in the carriage unit 2 and engages with a groove of the lead screw.

The print medium P having been fed is nipped and conveyed by a sheet feeding roller and a pinch roller, and is guided to a printing position on a platen 4 (scanning area of the print head). Since capping is applied on a face surface of the print head 9 in a normal pause state, a cap is opened prior to printing to bring the print head 9 and the carriage unit 2 into a scannable state. Thereafter, when data for one scan is accumulated in a buffer, the carriage unit 2 is scanned by the carriage motor 310, and printing is performed as described above.

Although not illustrated in FIG. 1, the printing apparatus 100 is provided with a first drying means 701 and a second drying means 706 (see FIG. 8) for heating and drying the ink applied on the print medium P after completion of the printing operation. Details of the first drying means 701 and the second drying means 706 will be described later. The first drying means 701 and the second drying means 706 also have a function of heating water-soluble resin fine particles described later to form coating. The water-soluble resin fine particles are a resin for forming a film by being applied onto the print medium P and then heated and for improving abrasion resistance of an image. The print medium P is printed by the print head 9 described later and then wound by the winding spool 6 to form a roll-shaped winding medium.

Here, the printing apparatus 100 can perform what is called multipass printing in which an image is printed in a unit region (1/n band) on the print medium P by a plurality of (n) scans of the print head 9. This multipass printing will be described later. A nozzle configuration for performing multipass printing will be described later in detail.

Figure 2:
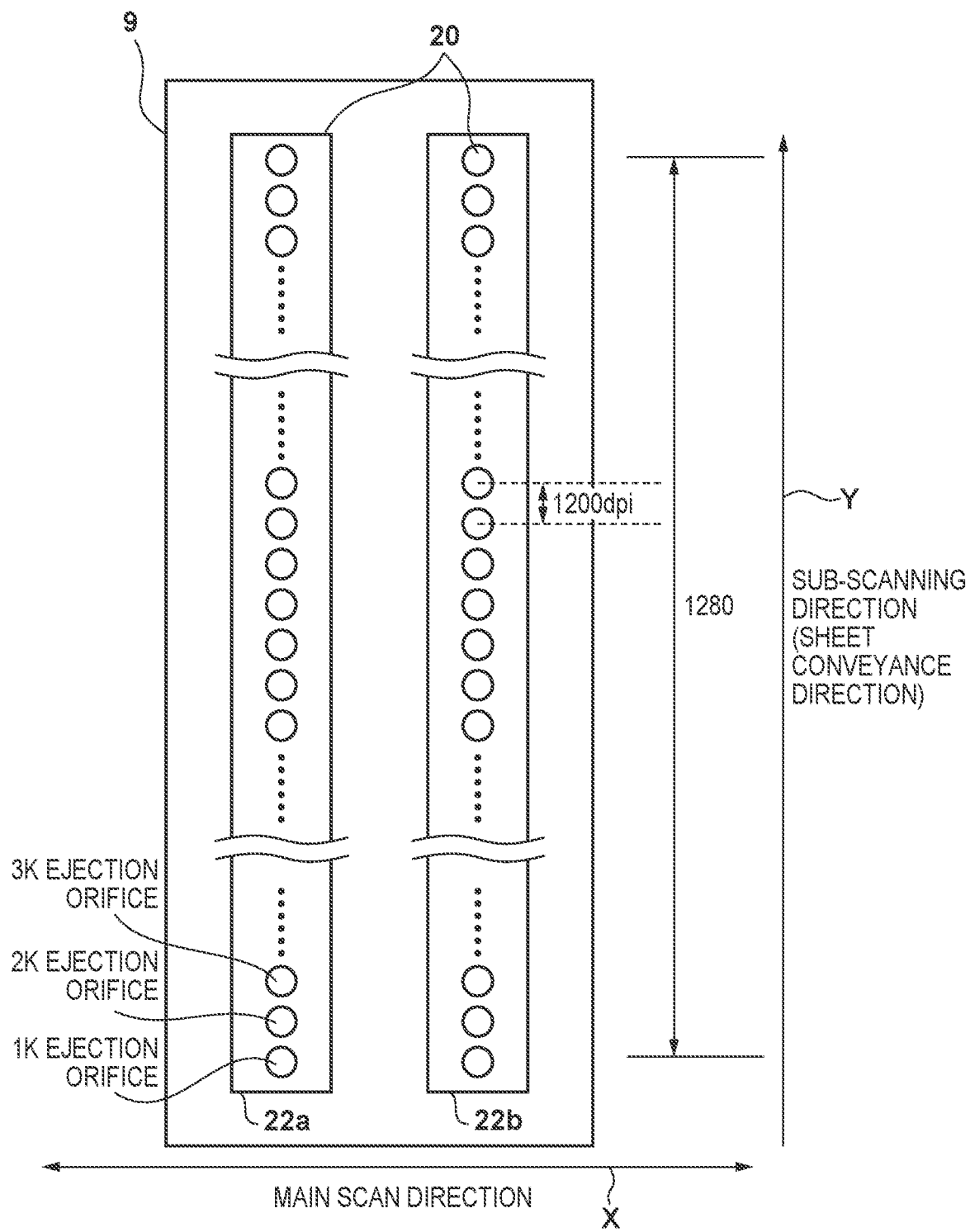
FIG. 2 is a schematic diagram of a print head as viewed from an ejection orifice side.

Next, the print head 9 will be described. In the print head 9, as illustrated in FIG. 2, 1280 ejection orifices 20 are arrayed in a sub-scanning direction at a density of 1200 ejection orifices per inch. The 1280 arrayed ejection orifices 20 form an ejection orifice row for one color.

Figure 3:
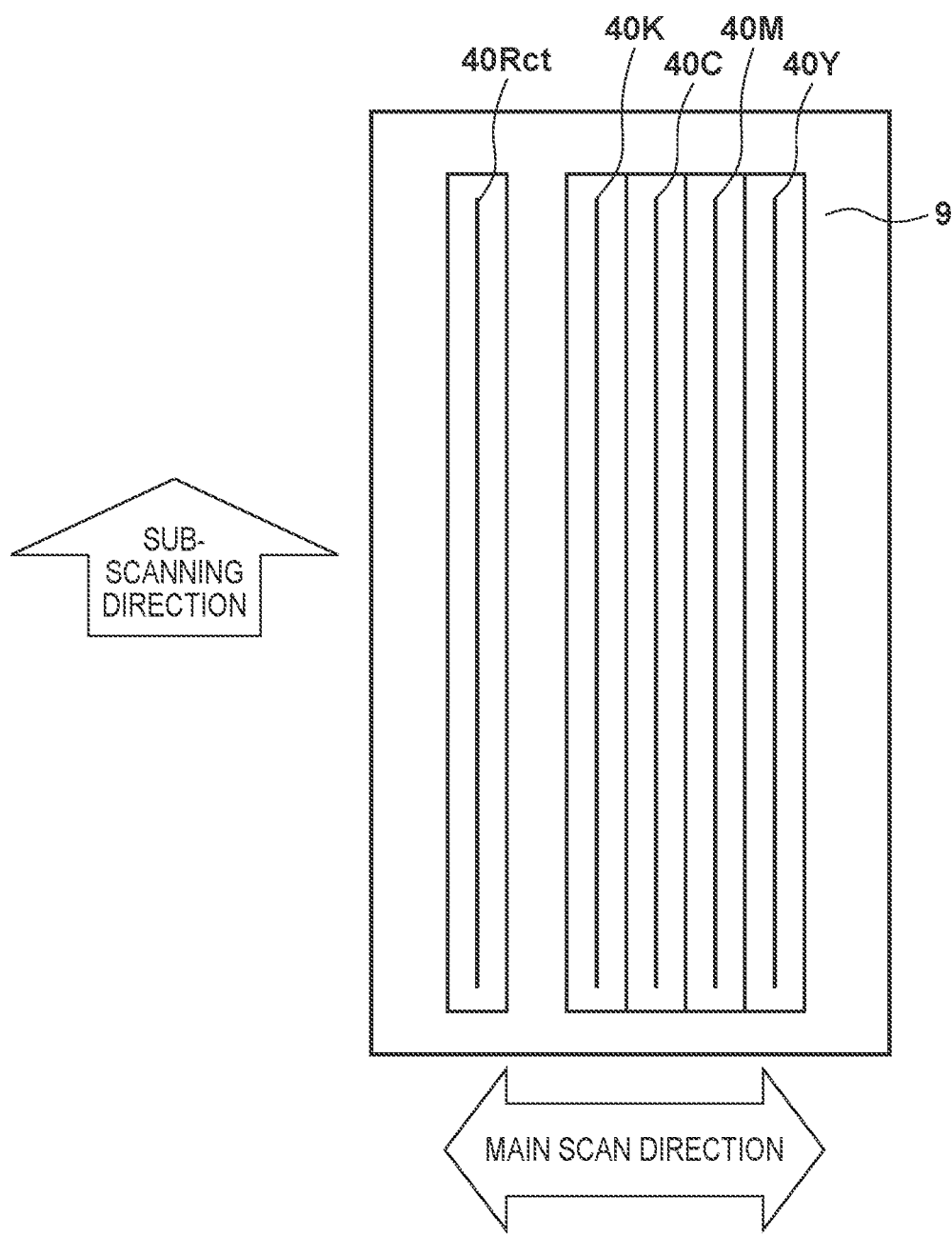
FIG. 3 is a view illustrating an ejection orifice surface of the print head.

FIG. 3 is a view illustrating the configuration of the print head 9 when observed from the ejection orifice surface side. In the first embodiment, five boards forming the ejection orifice rows are mounted, and respectively include a black ejection orifice row 40K, a cyan ejection orifice row 40C, a magenta ejection orifice row 40M, a yellow ejection orifice row 40Y, and a treatment liquid ejection orifice row 40Rct. In the present embodiment, the treatment liquid can be ejected in addition to the ink. The treatment liquid is a reaction liquid that reacts with a solid content such as a color material contained in the ink and resin fine particles to promote aggregation thereof. Details of the treatment liquid will be described later.

These ejection orifice rows are connected to respective ink tanks not illustrated that store corresponding ink, and thus ink is supplied. Note that the print head 9 and the ink tank used in the present embodiment may be integrally configured, or may have a separable configuration.

Figure 4:
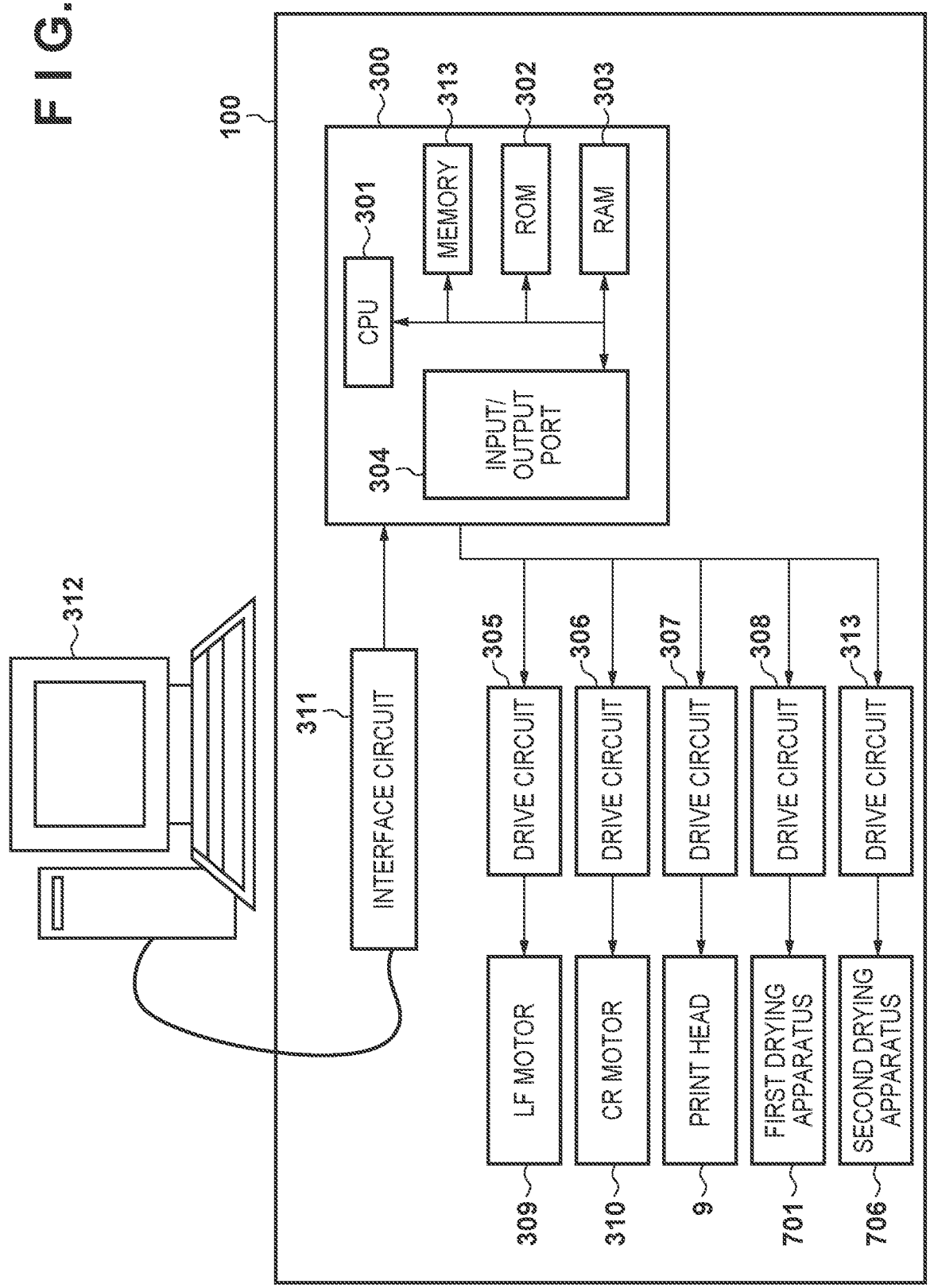
FIG. 4 is a schematic diagram illustrating a printing control system of a printing apparatus.

FIG. 4 is a block diagram illustrating a schematic configuration of the control system in the printing apparatus 100 in the present embodiment.

A main control unit 300 includes a CPU 301 that executes processing operations such as calculation, selection, determination, and control, and printing operations. The main control unit 300 includes further includes a ROM 302 that stores a control program and the like to be executed by the CPU 301, a RAM 303 used as a buffer of printing data, and an input/output port 304. A memory 313 stores a mask pattern and the like described later. The input/output port 304 is connected with a conveyance motor (LF motor) 309, the carriage motor (CR motor) 310, the print head 9, the first drying means 701, the second drying means 706, and respective drive circuits 305, 306, 307, 308, and 313 for them. The main control unit 300 is connected to a PC 312, which is a host computer, via an interface circuit 311.

Data Processing Process

Figure 5:
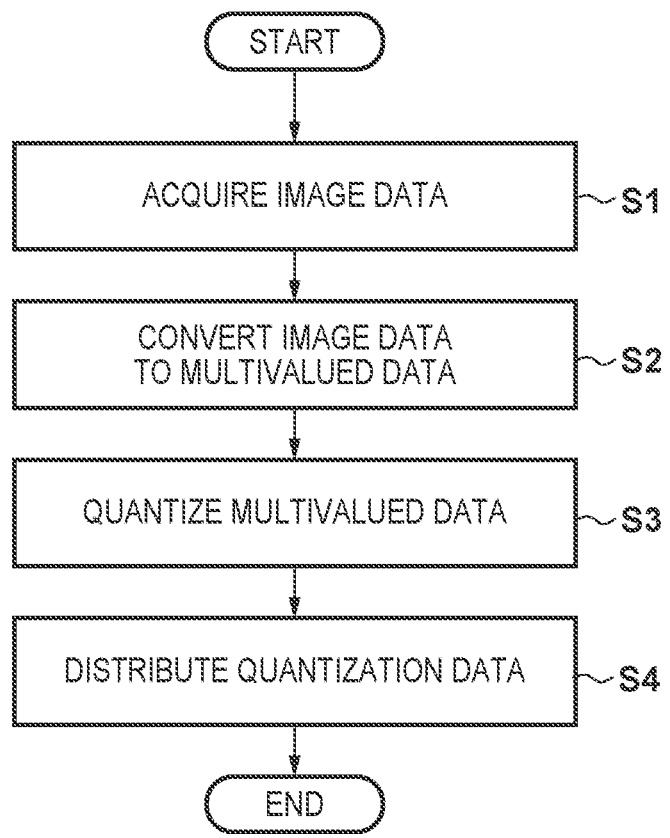
FIG. 5 is a flowchart illustrating a print data generation process.

Next, printing data generation processing executed by the CPU 301 according to the control program will be described with reference to FIG. 5. FIG. 5 is a flowchart illustrating generation processing of print data by the CPU 301.

First, in step S1, the CPU 301 acquires image data (luminance data) input to the printing apparatus 100 from the PC 312, which is a host computer. The image data is represented by 8-bit 256 value information (0 to 255) for each color of red (R), green (G), and blue (B).

In step S2, the CPU 301 converts the image data represented by R, G, and B into multivalued data represented by a plurality of types of inks used for printing. This color conversion processing generates multivalued data represented by 8-bit 256 value information (0 to 255) that determines gradation in ink of each pixel group including a plurality of pixels.

In step S3, the CPU 301 executes quantization of the multivalued data, and generates quantization data (binary data) represented by 1-bit binary information (0, 1) that determines ejection or non-ejection of each ink with respect to each pixel. Here, the quantization processing includes various quantization methods such as an error diffusion method, a dither method, and an index method, by which the processing can be performed.

In step S4, the CPU 301 performs distribution processing of distributing the quantization data to a plurality of scans over the unit region of the print head. This distribution processing generates printing data represented by 1-bit binary information (0, 1) that determines ejection or non-ejection of each ink with respect to each pixel in each of the plurality of scans over the unit region of the print medium P. This distribution processing is executed using a mask pattern that corresponds to the plurality of scans and determines permission or non-permission of ink ejection for each pixel.

Ejection of ink from the print head is controlled according to the printing data generated as described above.

Note that although a form in which the CPU 301 in the printing apparatus 100 executes all the processing of steps S1 to S4 has been described here, other forms can be implemented. For example, the PC 312 may execute all the processing of steps S1 to S4. Alternatively, for example, the PC 312 may execute a part of the processing, and the printing apparatus 100 may execute the remaining.

Multipass Printing Method

Figure 6:
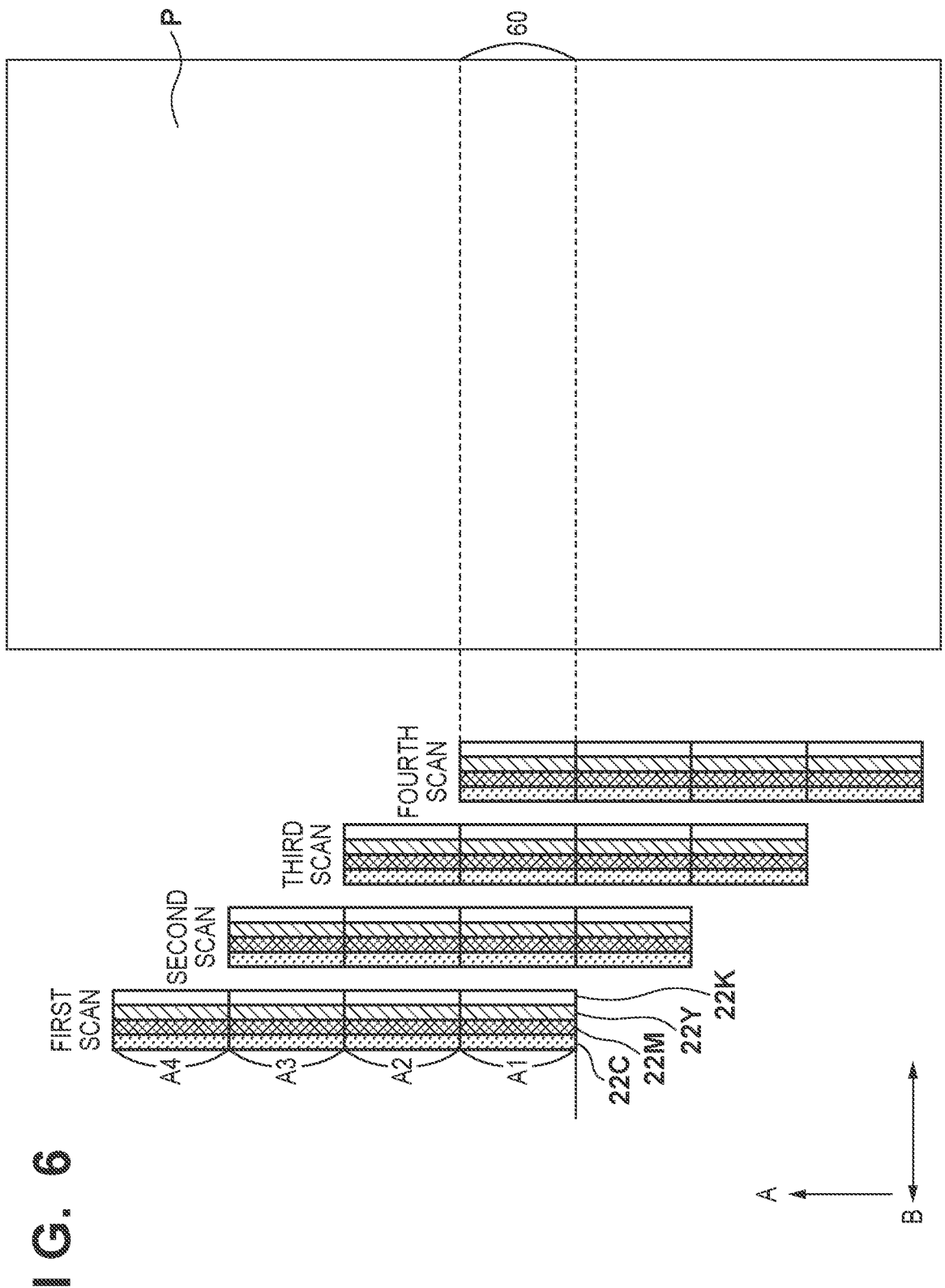
FIG. 6 is a view for explaining multipass printing.

In the present embodiment, printing is performed by a plurality of scans over the unit region on the print medium P. A method of printing an image by what is called multipass printing will be described. Here, for an easy-to-understand explanation, a case where printing is performed by applying the same mask pattern to each ink as illustrated in FIG. 6 in step S4 of FIG. 5 will be described. Note that here, an explanation will be made using an example in which printing is completed by performing four scans over the unit region.

FIG. 6 is a view for explaining a multipass printing method performed in the present embodiment. In the present embodiment, from each of four ejection orifice groups A1 to A4 configured by dividing each ejection orifice row 22 in an A direction in FIG. 6, ink is ejected in each of the four scans over the unit region. Note that in practice, the print medium P is conveyed to a downstream side in the A direction between scanning of the print head 9 described later. However, for an easy-to-understand explanation, FIG. 6 illustrates that the print head 9 is moved to an upstream side in the A direction between scanning.

First, in the first scan, the print head 9 is scanned in a positional relationship in which a unit region 60 on the print medium P and the ejection orifice group A1 in the ejection orifice row 22 oppose each other. Then, the ink is ejected from the ejection orifice group A1 to the unit region 60 according to the printing data corresponding to each type of ink corresponding to the first scan generated in step S4. After the first scan ends, the print medium P is conveyed by a distance corresponding to one ejection orifice group in the A direction. Thereafter, the second scan is performed, and the ink is ejected from the ejection orifice group A2 to the unit region 60. Thereafter, conveyance of the print medium P and ejection from the print head are alternately performed, and ink ejection from the ejection orifice groups A3 and A4 is executed in the third to fourth scans over the unit region 60. In this way, multipass printing on the unit region 60 is completed.

Figure 7:
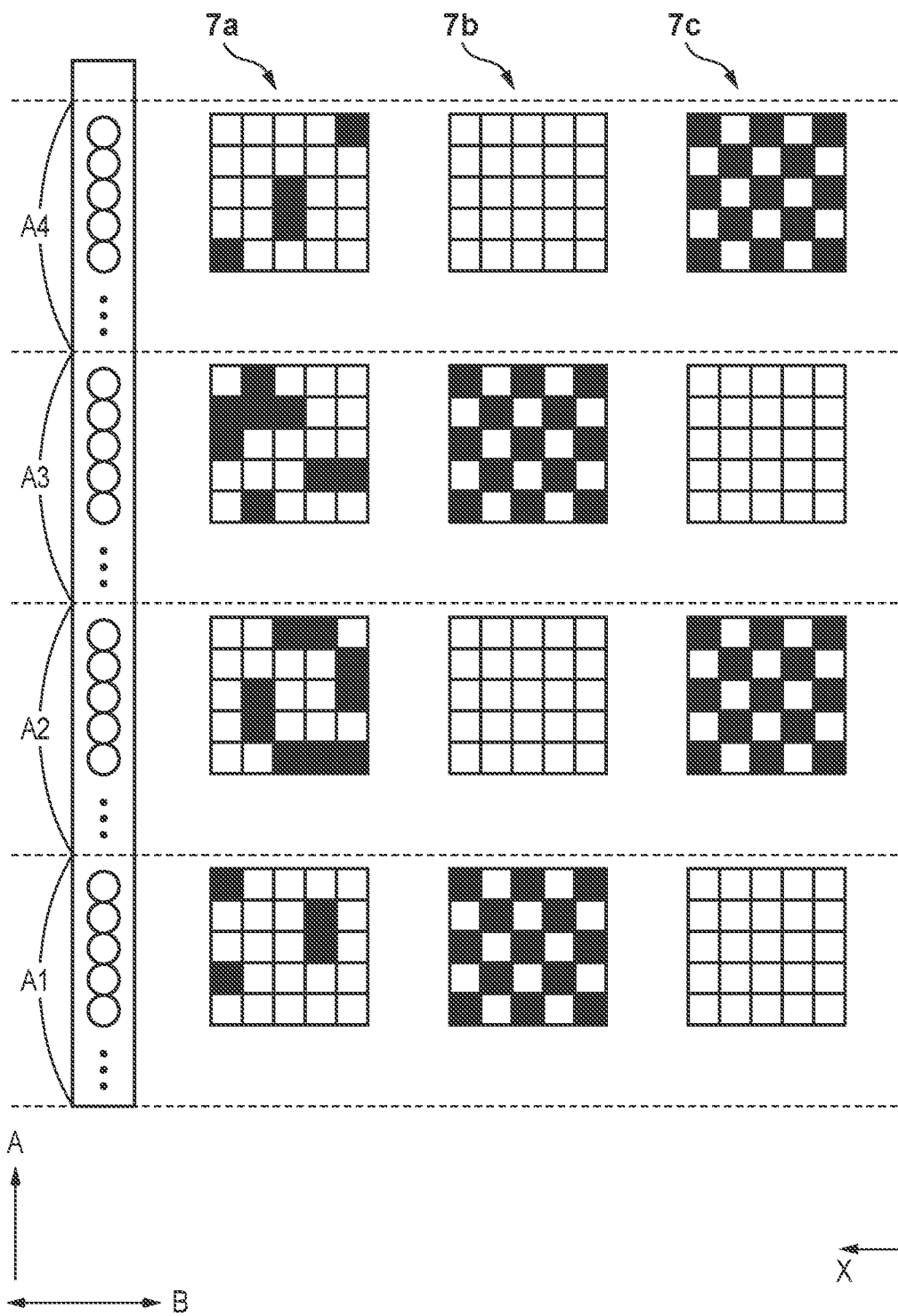
FIG. 7 is a schematic diagram illustrating a mask pattern used in multipass printing.

In the mask patterns illustrated in FIG. 7, pixels filled in black indicate pixels (hereinafter, also referred to as print permission pixels) that permit ink ejection when ink ejection is determined by quantization data. Pixels indicated in white indicate pixels (hereinafter, also referred to as non-print permission pixels) that do not permit ink ejection even when ink ejection is determined by quantization data. FIG. 7 illustrates mask patterns each having a size of 5 pixels×5 pixels, and distribution processing is performed for all the quantization data corresponding to each unit region by repeatedly applying these mask patterns in the X direction and the Y direction.

The number of pixels permitted for ejection that exist in each of the four mask patterns illustrated in FIG. 7 is 5 pixels×5=25 pixels. That is, the print permission rate is 100% when the pixels that permit ejection of the four mask pattern of 5 pixels×5 pixels are added. By performing a logical product (AND) processing of a part (size of 5 pixels×5 pixels) of the binary data of each ink and a mask pattern corresponding to each printing scan (each pass), it is possible to generate printing data for applying ink in each printing scan.

Looking at the mask pattern corresponding to each scan, four print permission pixels are arranged in the mask pattern corresponding to the first scan (ejection orifice group A1). Therefore, the print permission rate of the mask pattern corresponding to the first scan is about 16% (=4/25×100). Hereinafter, the print permission rates of the mask patterns corresponding to the second scan (ejection orifice group A2) to the fourth scan (ejection orifice group A4) are 32%, 36%, and 16%, respectively. Therefore, use of this mask pattern enables the ink to be distributed so as to be ejected over the entire ejection orifice row of the print head. Note that the patterns illustrated in FIG. 7 are an excerpt of the mask pattern illustrated for an easy-to-understand explanation, and there is a part slightly different from the print permission rate described above.

Ink Composition

Next, the composition of the color ink and the water-soluble resin fine particle ink used in the present embodiment will be described. Hereinafter, "%" is a value based on mass unless otherwise specified.

The color ink containing the pigment used in the present embodiment and the water-soluble resin fine particle ink containing no or only a trace of pigment both contain a water-soluble organic solvent. The water-soluble organic solvent preferably has a boiling point of 150° C. or higher and 300° C. or lower from the viewpoint of the wettability and moisture retaining property of a head face surface. From the viewpoint of the function of the film formation aid with respect to the resin fine particles and the swelling solubility to the print medium P on which a resin layer is formed, ketone compounds such as acetone and cyclohexanone, propylene glycol derivatives such as tetraethylene glycol dimethyl ether, heterocyclic compounds having a lactam structure represented by N-methyl-pyrrolidone and 2-pyrrolidone, and the like are particularly preferable.

From the viewpoint of ejection performance, the content of the water-soluble organic solvent is preferably 3 wt. % or more and 30 wt. % or less.

Specific examples of the water-soluble organic solvent include the following. Alkyl alcohols with 1 to 4 carbons, such as methyl alcohol, ethyl alcohol, n-propyl alcohol, isopropyl alcohol, n-butyl alcohol, sec-butyl alcohol, and tert-butyl alcohol. Amides such as dimethylformamide and dimethylacetamide, and ketones or ketoalcohols such as acetone and diacetone alcohol. Ethers such as tetrahydrofuran and dioxane. Polyalkylene glycols such as polyethylene glycol and polypropylene glycol. Alkylene glycols in which an alkylene group contains 2 to 6 carbon atoms, such as ethylene glycol, or propylene glycol, butylene glycol, triethylene glycol, 1,2,6-hexanetriol, thiodiglycol, hexylene glycol, and diethylene glycol. Lower alkyl ether acetate such as polyethylene glycol monomethyl ether acetate. Glycerin. Lower alkyl ethers of polyhydric alcohol such as ethylene glycol monomethyl (or ethyl) ether, diethylene glycol methyl (or ethyl) ether, and triethylene glycol monomethyl (or ethyl) ether. Polyhydric alcohol such as trimethylol propane and trimethylol ethane. N-methyl-2-pyrrolidone, 2-pyrrolidone, and 1,3-dimethyl-2 imidazolidinone.

The water-soluble organic solvent as described above can be used alone or as a mixture. It is desirable to use deionized water as water. In the color ink and the water-soluble resin fine particle ink used in the present embodiment, a surfactant, an antifoaming agent, a preservative, an antifungal agent, and the like can be appropriately added in addition to the above components in order to have a desired physical property value as necessary.

Generation of Resin Fine Particle Dispersion

The color ink of the present embodiment contains water-soluble resin fine particles for bringing the print medium P and the color material into close contact with each other to improve the abrasion resistance (fixability) of a print image. The resin fine particles are melted by heat, and film formation of the resin fine particles and drying of the solvent contained in the ink are performed by a heater. In the present embodiment, the "resin fine particles" mean polymer fine particles present in a state of being dispersed in water.

Specific examples include the following. Acrylic resin fine particles synthesized by emulsion polymerization or the like of monomers such as (meth) acrylic acid alkyl ester and (meth) acrylic acid alkyl amide. Styrene-acrylic resin fine particles synthesized by emulsion polymerization or the like of a monomer of styrene with (meth) acrylic acid alkyl ester, (meth) acrylic acid alkyl amide, or the like. Polyethylene resin fine particles, polypropylene resin fine particles, polyurethane resin fine particles, and styrene-butadiene resin fine particles.

Specific examples may include core shell type resin fine particles having different polymer compositions in a core portion and a shell portion constituting the resin fine particles, or resin fine particles obtained by emulsion polymerization in a periphery of acrylic fine particles synthesized in advance for controlling the particle diameter as seed particles. Furthermore, specific examples may include hybrid resin fine particles in which different resin fine particles such as acrylic resin fine particles and urethane resin fine particles are chemically bonded.

The "polymer fine particles present in a state of being dispersed in water" may be in the form of resin fine particles obtained by homopolymerizing a monomer having a dissociable group or copolymerizing a plurality of monomers, i.e., what is called a self-dispersible resin fine particle dispersant. Here, examples of the dissociable group include a carboxyl group, a sulfonic acid group, and a phosphoric acid group, and examples of the monomer having the dissociable group include acrylic acid and methacrylic acid. Furthermore, the "polymer fine particles present in a state of being dispersed in water" may be what is called an emulsification dispersion type resin fine particle dispersant in which resin fine particles are dispersed with an emulsifier. As the emulsifier, a material having an anionic charge can be used regardless of a low molecular weight or a high molecular weight.

Treatment Liquid

In the present embodiment, a treatment liquid (RCT) is used for the purpose of forming an image on a poorly absorbent or non-absorbent medium. The treatment liquid used in the present embodiment contains a reactive component that reacts with a pigment contained in the ink to aggregate or gel the pigment. The reactive component is specifically a component that can destroy the dispersion stability of the ink when mixed on the print medium P or the like with the ink having a pigment stably dispersed or dissolved in an aqueous medium by the action of an ionic group. In the present embodiment, since an anionic color material is used, the reactant can be broadly classified into an acid-based reactant, a polyvalent metal-based reactant, and a cationic polymer-based reactant.

The acid-based reactant can be broadly classified into an inorganic acid and an organic acid. In the present embodiment, the organic acid will be described, but the acid-based reactant is not limited to the organic acid. Specific examples of the water-soluble organic acid include oxalic acid, polyacrylic acid, formic acid, acetic acid, propionic acid, glycolic acid, malonic acid, malic acid, maleic acid, ascorbic acid, levulinic acid, succinic acid, glutaric acid, glutamic acid, fumaric acid, citric acid, tartaric acid, lactic acid, pyrrolidone carboxylic acid, pyrone carboxylic acid, pyrrole carboxylic acid, furancarboxylic acid, pyridine carboxylic acid, coumaric acid, thiophene carboxylic acid, nicotinic acid, oxysuccinic acid, and dioxysuccinic acid. The content of the organic acid is preferably 3.0 mass % or more to 90.0 mass % or less, and more preferably 5.0 mass % or more to 70.0 mass % or less, with respect to the total mass of the composition contained in the treatment liquid.

The polyvalent metal-based reactant is preferably as follows. Examples include divalent metal ions such as $Ca^{2+}$, $Cu^{2+}$, $Ni^{2+}$, $Mg^{2+}$, $Zn^{2+}$, $Sr^{2+}$, and $Ba^{2+}$. Examples can further include, but are not limited to, trivalent metal ions such as $Al^{3+}$, $Fe^{3+}$, $Cr^{3+}$, and $Y^{3+}$. In order to contain these polyvalent metal ions in the treatment liquid, a salt of a polyvalent metal may be used. The salt is a metal salt composed of a polyvalent metal ion as described above and an anion that bonds to these ions, and is required to be soluble in water. Preferred anions for forming the salt include, but are not limited to, $Cl^-$, $NO_3^-$, $I^-$, $Br^-$, $ClO_3^-$, $SO_4^{2-}$, $CO_3^{2-}$, $CH_3COO^-$, and $HCOO^-$, for example.

In the present embodiment, from the viewpoint of reactivity, colorability, ease of handling, and the like, $Ca^{2+}$, $Mg^{2+}$, $Sr^{2+}$, $Al^{3+}$, and $Y^{3+}$ are particularly preferable as the polyvalent metal ion, and among them, $Ca^{2+}$ is particularly preferable. As an anion for forming a polyvalent metal ion and a salt, methanesulfonic acid is particularly preferable from the viewpoint of safety and the like.

In the cationic polymer-based reactant, those water-soluble are preferable. Specific examples of the cationic polymer include polyallylamine hydrochloride, polyamine sulfonate, polyvinylamine hydrochloride, and chitosan acetate. In addition to those, specific examples can include a copolymer of vinylpyrrolidone and an aminoalkylalkylate quaternary salt in which a part of the nonionic polymer substance is cationized, and a copolymer of acrylamide and an aminomethylacrylamide quaternary salt. The treatment liquid containing a cationic polymer as a reactive component is preferably colorless, but is not necessarily required to exhibit no absorption in a visible range. That is, the treatment liquid may exhibit a light color indicating absorption in the visible range if within a range where an image is not affected when the image is formed even if the treatment liquid exhibits absorption in the visible range. Note that the treatment liquid is not necessarily used in all the printing modes, and is applied in an amount necessary for forming a printed image in view of the ink application amount.

Drying Means

In the printing apparatus of the present embodiment, the resin fine particles contained in the ink are heated by a heating and drying means. The heating temperature is desirably equal to or higher than the minimum film forming temperature of the resin fine particles, and it is necessary to evaporate most of liquid components such as the water-soluble organic solvent in the ink during heating. Therefore, the printing apparatus is configured to have a temperature distribution in the conveying direction of the print medium P enough to secure the heating time for supplying the energy necessary for evaporation of most of the liquid components.

The printing method of the present embodiment includes heating at least a surface of the non-permeable print medium P to which the ink is applied, but includes heating a portion of the non-permeable print medium P on the downstream side in the sub-scanning direction from the region to which the ink is applied.

Configuration of Drying Means

Next, an example of the drying means in the printing apparatus of the present embodiment will be described.

The drying means has at least two stages of drying in the conveying direction of the print medium P. That is, the drying includes first drying and second drying positioned downstream. The drying means is preferably configured such that control of the heating temperature and the air blowing speed can be changed and adjusted by an operation panel attached to the printing apparatus or a control host computer to which the printing apparatus is connected. In this case, the operator can change and adjust the heating temperature according to the type and thickness of the print medium P conveyed on the platen, the temperature and humidity of the surrounding environment in which the printing apparatus is placed, and the like.

In the present embodiment, a temperature control means in the drying means controls the heating temperature of the gas in the drying means to be constant. Note that in the drying means, when heating the print medium P, it is also possible to detect the temperature of the print medium P by using a configuration such as an infrared sensor in combination, and to control the heating temperature and the air blowing speed of the drying means so as to keep the detected temperature to a predetermined temperature.

First Drying

In the first drying, for example, drying with a heated gas is performed in order to dry the ink on the print medium P. By thickening the ink by evaporation in the first drying, it is possible to reduce the influence of disturbance of the surface shape and the image of the ink film due to drying by air blowing in the second drying described later.

FIG. 8 is a view illustrating a cross section along the conveying direction of a main part of the printing apparatus in the present embodiment. The print medium P is conveyed in the conveying direction (Y direction) by a sheet feeding roller not illustrated. The first drying means 701 is a drying mechanism by air blowing disposed in a conveyance path of the print medium P, and includes a heating element 702 for heating gas and an air blower for blowing the heated gas to the print medium P. The type of the heating element 702 is not limited as long as temperature can be controlled, but one having high heat transfer efficiency to air is preferable. The air blower includes an air blowing fan 703, a fan duct 704, and an air blowing discharge portion 705. Although not illustrated in FIG. 8, a temperature sensor is disposed in the fan duct 704, and the temperature of the heating element 702 can be controlled.

Depending on the amount of ink applied, a large amount of vapor may be generated in the drying process. Since there is a possibility that the drying efficiency decreases by filling the first drying means 701 with vapor, the first drying means 701 may be provided with a mechanism for recovering the vapor and discharging the vapor to the outside.

In the first drying, the ink is not sufficiently thickened, and air blowing from an ink ejection surface side of the print medium P may affect the shape of the ink film surface. Therefore, it is preferable to blow air in a direction substantially parallel to the ink ejection surface to an extent that does not affect the ink film surface.

It is preferable to control the temperature of the heating element 702 so that the temperature of the blown gas in the first drying is higher than that in an area where an image is printed by scanning the print head 9. This is to reduce image failure due to taking time for the ink to dry and thicken in a case of performing printing using a large amount of ink in particular. A printing mode at a higher speed requires a longer first drying area. The temperature is not limited, but is preferably 35° C. to 60° C. in terms of good drying efficiency.

Second Drying

In the second drying, for example, in order to fix the ink on the print medium P, heating and fixing are performed quickly to such an extent that the ink does not flow.

The heating temperature is preferably higher than the minimum film forming temperature of the resin fine particles contained in the ink described later. The minimum film forming temperature represents the minimum temperature required for the resin fine particles to form a film by heating. A dispersoid of the resin fine particles is spread on a thermal conductive plate with a temperature gradient to form continuous coating having a uniform dry matter forming dry coating, and the minimum temperature when the coating is not whitened can be measured as the minimum film forming temperature. Since it is necessary to dry the print medium in a heating unit having a predetermined length for a high-speed printing mode, the heating temperature is preferably higher in terms of good drying efficiency. The lower limit is not limited, but is preferably 60° C. or higher, and more preferably 80° C. or higher. On the other hand, when the heating temperature is too high, the print medium P may be deformed as described above. Therefore, the heating temperature is preferably equal to or lower than a withstanding temperature limit of the print medium P, and the upper limit is not limited, but is preferably 120° C. or lower, and more preferably 100° C. or lower.

The second drying means 706 of FIG. 8 is a drying mechanism by air blowing disposed on the downstream side relative to the first drying means 701 in the conveyance path of the print medium P, and includes a heating element 707 for heating gas and an air blower for blowing the heated gas to the print medium P. The air blower includes an air blowing fan 708, a fan duct 709, and an air blowing discharge portion 710. The air blowing fan 709 may be configured to circulate the gas in the second drying means 706 or may be configured to take in the outside air from the viewpoint of power consumption. The amount of outside air taken in may be adjustable. Also the second drying may be provided with a mechanism for recovering vapor in a case where there is a concern that the drying efficiency decreases due to vapor similarly to the first drying.

Evaluation Method

In the present embodiment, a Scotchcal Graphical Film IJ1220N (Gloss specification, 3M Japan), which is an inkjet medium for outdoor sign use, is used as the print medium P.

(1) Glossiness Evaluation

Evaluation and evaluation criteria of glossiness after image formation in the present embodiment will be described below.

The "glossiness" is evaluated by the gloss measured according to a method determined in JIS K 5600-4-7. Then, "improve glossiness" means "increasing the value of glossiness". Briefly, evaluation was performed according to the following criteria by visual evaluation.

A (High Glossiness)

A print region and the print medium P exhibit similar glossiness.

B (Medium Glossiness)

The glossiness of the print region is reduced but at an acceptable level.

C (Low Glossiness)

The glossiness of the print region significantly decreases.

(2) Surface Uniformity Evaluation

Evaluation and evaluation criteria of surface uniformity after image formation in the present embodiment will be described below.

A (Good Uniformity)

Level at which unevenness cannot be visually recognized in an image forming region.

B (Medium Uniformity)

Level at which unevenness can be visually recognized in the image forming region but is acceptable.

C (Low Uniformity)

Level at which the image forming region has unevenness that causes a problem in practical use.

(3) Image Fastness Evaluation

Evaluation and evaluation criteria of image fastness after image formation in the present embodiment will be described below.

Image fastness is determined by performing abrasion resistance evaluation. The evaluation machine used is an apparatus conforming to a friction tester type II (Gakushin type) specified in the color fastness test method to rubbing (JIS L-0849), and this is also generally used in the "friction and abrasion resistance test" of ink. A solid image with varying application amount of black ink is printed on a vinyl chloride sheet on a curved surface, a thermally fixed test piece is attached, and the degree of transfer to the fabric and the degree of scraping of the image forming region when the test piece is rubbed back and forth 150 times with a white cotton fabric fixed to a friction block is visually observed and evaluated according to the following criteria.

A (No Scraping and No Transfer)

There is almost no scraping of the image forming region. There is almost no transfer.

B (No Image Scraping and Some Transfer)

There is some transfer, but scraping of the image forming region is at a practically acceptable level.

C (Occurrence of Image Scraping)

Level at which the image forming region has scraping that causes a problem in practical use.

High-Efficiency Drying by Wind Direction

The configurations of the first drying means 701 and the second drying means 706 in the present embodiment are as illustrated in FIG. 8. Each air blowing method will be described. Note that in the present embodiment, it is assumed that the temperature of the gas in the printing area where the ink is applied is T0, the temperature of the gas in the first drying is T1, and the temperature of the gas in the second drying is T2.

[First Drying]

The air blowing discharge portion 705 is disposed so that the gas to be blown is substantially parallel to the ink ejection surface of the print medium P and substantially parallel to the conveying direction of the print medium P. The orientation in which the gas is blown may be either the downstream orientation or the upstream orientation in the conveying direction of the print medium P. The number of the air blowing discharge portions 705 is not limited to one, and a plurality of them may be disposed in the conveying direction of the print medium P.

[Second Drying]

The air blowing discharge portion 710 is arranged such that the gas to be blown is at an angle closer to perpendicular in the conveying direction and a width direction of the print medium P than the air blowing discharge portion 705 with respect to the ink ejection surface of the print medium P. The orientation in which the gas is blown may be either the downstream orientation or the upstream orientation in the conveying direction of the print medium P. The number of the air blowing discharge portions 710 is not limited to one, and a plurality of them may be disposed in the conveying direction of the print medium P. The air blowing discharge portion 710 may have a configuration in which gas is ejected to the surface of the print medium P from a nozzle arranged on a surface opposing the ink ejection surface of the print medium P. In the present embodiment, the air blowing temperature T2 was set to 80° C.

Examples and Comparative Examples in the present embodiment will be described. In Examples 1 to 3, the air blowing temperature T1 in the first drying was set to 25° C., 40° C., and 60° C., respectively. Since the temperature T0 of the gas in the printing area where the ink is applied is 25° C., the relationship of $T0=T1<T2$ is established in Example 1. In Examples 2 and 3, the relationship of $T0<T1<T2$ is established. In Comparative Example 1, the temperature setting in each drying is the same as that in Example 3, but the air blow orientation is configured such that air is blown substantially parallel to the ink ejection surface in both the first drying and the second drying. In Comparative Example 2, the temperature setting in each drying is the same as that in Example 3, but the air blow orientation is configured such that air is blown substantially perpendicularly to the ink ejection surface in both the first drying and the second drying. In Comparative Examples 1 and 2, the relationship of $T0<T1<T2$ is established. In Comparative Example 3, air blowing is not performed in the first drying, and hot air is blown substantially perpendicularly similarly to Examples 1 to 3 only in the second drying. As in Comparative Example 2, in Comparative Example 4, the air blow orientation is configured such that air is blown substantially perpendicularly in both the first drying and the second drying, and air is blown at 80° C. in both, where $T0<T1=T2$ is established.

[Results]

In the present embodiment, the evaluation content includes glossiness, surface uniformity, and image fastness. The above-described method was used for these evaluations.

TABLE 1

|  | FIRST DRYING | | SECOND DRYING | | EVALUATION RESULTS | | |
| --- | --- | --- | --- | --- | --- | --- | --- |
|  | TEMPERATURE T1 | WIND DIRECTION | TEMPERATURE T2 | WIND DIRECTION | GLOSSINESS | SURFACE UNIFORMITY | IMAGE FASTNESS |
| EXAMPLE 1 | 25° C. | PARALLEL | 80° C. | PERPENDICULAR | B | B | B |
| EXAMPLE 2 | 40° C. | PARALLEL | 80° C. | PERPENDICULAR | B | A | B |
| EXAMPLE 3 | 60° C. | PARALLEL | 80° C. | PERPENDICULAR | B | A | A |
| COMPARATIVE EXAMPLE 1 | 60° C. | PARALLEL | 80° C. | PARALLEL | B | A | C |
| COMPARATIVE EXAMPLE 2 | 60° C. | PERPENDICULAR | 80° C. | PERPENDICULAR | C | A | B |
| COMPARATIVE EXAMPLE 3 |  |  | 80° C. | PERPENDICULAR | C | C | B |
| COMPARATIVE EXAMPLE 4 | 80° C. | PERPENDICULAR | 80° C. | PERPENDICULAR | C | C | B |

Table 1 indicates that Examples 1 to 3 and Comparative Example 1 were better in glossiness than Comparative Examples 2 to 4. Among them, in Comparative Example 1, also in the second drying, irregularities on the ink film surface are suppressed because strong air blowing is not performed on the ink ejection surface, and thus glossiness is good. On the other hand, image fastness decreased in the same heating and drying time probably due to low heat transfer efficiency. In Comparative Example 2, the heat transfer efficiency was relatively good, and the image fastness was good, but the ink film surface was disturbed, and the glossiness significantly decreased. In Example 2, Example 3, and Comparative Example 1 where the relationship of T0<T1<T2 is established, the surface uniformity was improved as compared with Example 1 where T0=T1<T2 is established.

Comparative Example 3 resulted in a decrease in the glossiness and the surface uniformity. This is presumed to be because heating at a high temperature was performed in a state where thickening of the ink was insufficient, and thus disturbance of the ink film surface and unevenness due to a drying speed difference occurred. Comparative Example 4 was lower in the surface uniformity than Comparative Example 2, and it is presumed that keeping the relationship of T1<T2 improves the image quality.

From the above, it has been found that, in the first drying and the second drying, the relationship of T1<T2 is established, and highly efficient drying is performed in the second drying rather than the first drying, whereby an image with better glossiness and surface uniformity can be obtained while keeping image fastness in a predetermined time. Furthermore, it was found that a preferable image in terms of surface uniformity can be obtained when the relationship of T0<T1<T2 is established.

In the present embodiment, the difference in wind direction is used as a means for achieving a difference in the drying efficiency between the first drying and the second drying, but the same effect can be obtained by controlling the difference by the quantity of air or the air speed. More specifically, for example, at least one of the quantity of air and the air speed in the second drying is made larger than that in the first drying.

Second Embodiment

Next, regarding the second embodiment, parts different from those in the first embodiment will be described. Note that also in the present embodiment, it is assumed that the temperature of the gas in the printing area where the ink is applied is T0, the temperature of the gas in the first drying is T1, and the temperature of the gas in the second drying is T2.

In consideration of surface uniformity, it is effective to promote drying of ink also during image formation by printing. Since this also secures a long total drying time, there is a possibility of successful achievement in improvement in image fastness within a predetermined time, downsizing of the drying means, reduction in power consumption by lowering a heating temperature and an air blowing speed in each drying process, and the like.

On the other hand, at the time of multipass printing in which printing is performed in a divided manner, heating and high-speed drying cause the droplet shape of the ink impacted on the print medium P to remain and cause a concern of glossiness decrease. High-temperature air blowing raise the temperature of the print head that ejects ink, and there is a possibility that drying of the nozzle also easily occurs.

In the present embodiment, using a third drying means 81 illustrated in FIG. 9, air is blown in a substantially parallel direction from the upstream side in the conveying direction of the print medium P toward immediately below the print head 9 to perform drying during image formation. The air blowing direction is not limited to this, and air may be blown from the downstream side in the conveying direction of the print medium P.

Similarly to the first drying means 701 and the second drying means 706, the third drying means 81 of FIG. 9 includes a heating element 84 for heating gas and an air blower for blowing the heated gas to the print medium P. The air blower includes an air blowing fan 82, a fan duct 81, and an air blowing discharge portion 83.

The temperature of the gas blown for drying is preferably higher from the viewpoint of drying efficiency. The lower limit is not limited, but is preferably 15° C. or higher, more preferably 20° C. or higher, and still more preferably 25° C. or higher. On the other hand, from the viewpoint of not decreasing the glossiness, the air blowing temperature is preferably not too high, and the upper limit is not limited, but is preferably 35° C. or lower, and more preferably 30° C. or lower.

In the first drying, the air blowing discharge portion 705 is disposed so that the gas to be blown is substantially parallel to the ink ejection surface of the print medium P and substantially parallel to the conveying direction of the print medium P. In the second drying, the air blowing discharge portion 710 is arranged such that the gas to be blown is at an angle closer to perpendicular in the conveying direction and a width direction of the print medium P than the air blowing discharge portion 705 with respect to the ink ejection surface of the print medium P.

Examples 4 to 6 present results of blowing air with the temperature T0 of the gas in the printing area where ink is applied being 25° C. The temperatures T1 of the gas in the first drying are 25° C., 40° C., and 60° C. The temperature T2 of the gas in the second drying was set to 80° C. similarly to the first embodiment. Therefore, the relationship of T0=T1<T2 is established in Example 4, and the relationship of T0<T1<T2 is established in Examples 5 and 6.

Comparative Example 5, Comparative Example 6, and Comparative Example 7 present results of blowing air with T0 being 40° C. The temperatures T1 of the gas in the first drying are 40° C. and 60° C., respectively. The relationship of T0>T1<T2 is established in Comparative Example 5, the relationship of T0=T1<T2 is established in Comparative Example 6, and the relationship of T0<T1<T2 is established in Comparative Example 7.

[Results]

In the present embodiment, the evaluation content includes glossiness, surface uniformity, and image fastness. The above-described method was used for these evaluations.

TABLE 2

| | DRYING DURING PRINTING | | FIRST DRYING AIR BLOWING | SECOND DRYING AIR BLOWING | EVALUATION RESULTS | | |
|---|---|---|---|---|---|---|---|
| | AIR BLOWING | TEMPERATURE T0 | TEMPERATURE T1 | TEMPERATURE T2 | GLOSSINESS | SURFACE UNIFORMITY | IMAGE FASTNESS |
| EXAMPLE 1 | NO | 25° C. | 25° C. | 80° C. | B | B | B |
| EXAMPLE 4 | YES | 25° C. | 25° C. | 80° C. | B | A | B |
| EXAMPLE 5 | YES | 25° C. | 40° C. | 80° C. | B | A | A |
| EXAMPLE 6 | YES | 25° C. | 60° C. | 80° C. | B | A | A |
| COMPARATIVE EXAMPLE 5 | YES | 40° C. | 25° C. | 80° C. | C | A | B |
| COMPARATIVE EXAMPLE 6 | YES | 40° C. | 40° C. | 80° C. | C | A | A |
| COMPARATIVE EXAMPLE 7 | YES | 40° C. | 60° C. | 80° C. | C | A | A |

Table 2 indicates that Examples 4 to 6 had better results in surface uniformity than Example 1 in which air blowing was not performed during image formation. On the other hand, there was almost no decrease in glossiness that is a concern. Comparative Example 5, which has the relationship of T0>T1<T2. and Comparative Example 6, which has the relationship of T0=T1<T2 has better results in surface uniformity than Example 1, but has result of significant decrease in glossiness. Comparative Example 7 has the relationship of T0<T1<T2, where the second drying achieved more efficient drying than the first drying, but resulted in glossiness decrease. This is presumed to be because the droplet shape of the ink remained due to the high temperature of T0, thereby decreasing the glossiness. The results of Example 5 and Comparative Example 7 indicate that the temperature of T0 is more preferably 25° C. rather than 40° C.

Third Embodiment

Next, regarding the third embodiment, parts different from those in the first embodiment will be described.

In the first embodiment, the effect of performing heating by blowing hot air to the ink ejection surface side of the print medium P in the second drying has been described. Here, a configuration in which heating is used in combination from the back surface side of the ink ejection surface of the print medium P in the second drying will be described with reference to FIG. 10. This enables downsizing of the drying means and image formation in a printing mode at a higher speed.

In the first drying, the ink is not sufficiently thickened, and heating from the back surface may decrease the surface uniformity due to a drying speed difference between the central portion and the end portion of an image forming region. Due to a flow of the solid content inside the ink, there is a possibility of formation of an irregular shape on the ink film surface and occurrence of glossiness decrease.

On the other hand, in the second drying, when the ink is sufficiently thickened, the influence of the heating method on the ink film is small. For example, it is possible to raise the temperature of the print medium P in a shorter time by blowing hot air from the back surface side of the ink ejection surface of the print medium P and retaining temperature. The region heated from the back surface side may be the entire region or a part of the second drying. The heating may be performed by controlling each of divided region to individual temperature. In a case of heating only a part from the back surface, the image is less likely to be affected in the downstream portion in the conveying direction of the print medium P.

Figure 10:
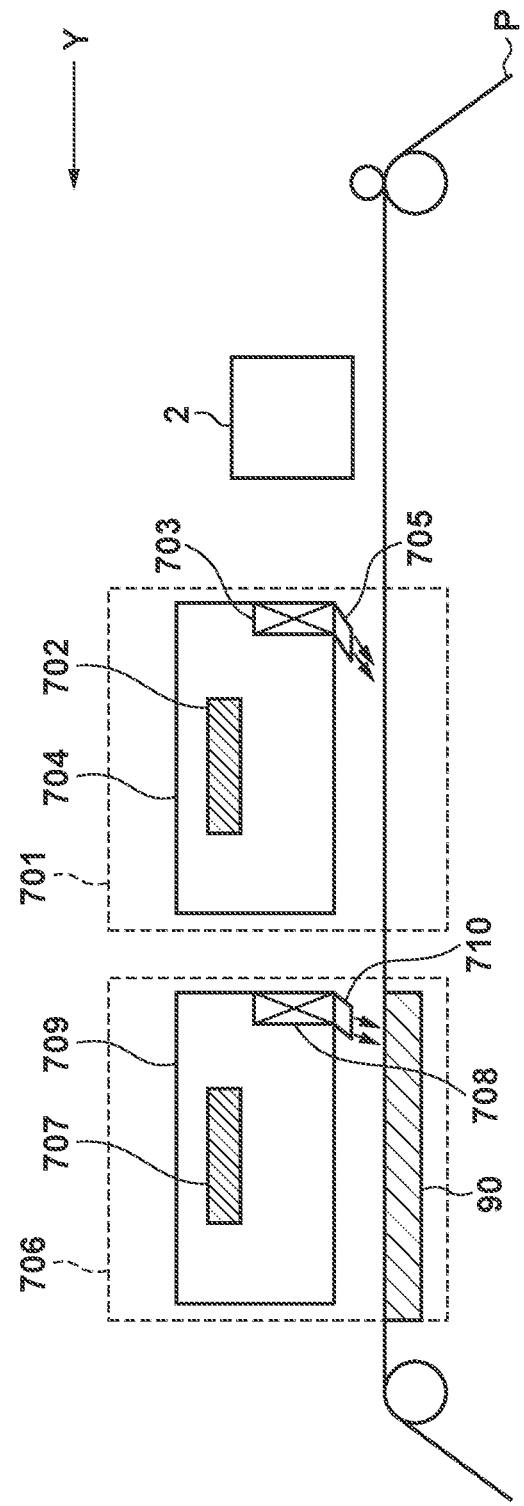
FIG. 10 is a schematic diagram of a heating unit in a third embodiment.

In the present embodiment, as illustrated in FIG. 10, a sheet heater 90 is brought into contact with the print medium P throughout the second drying, and the temperature can be raised by heat transfer from the back surface side of the ink ejection surface of the print medium P. Although not used in the present embodiment, the drying during image formation described in the second embodiment may be combined.

Note that in the present embodiment, it is assumed that the temperature of the print medium P in the printing area where the ink is applied is T0, the temperature of the print medium P in the first drying is T1, and the temperature of the print medium P in the second drying is T2.

Example 7 presents a result in a case of controlling the temperature so that the temperature T1 of the print medium P in the first drying becomes 40° C. and the temperature T2 of the print medium P in the second drying becomes 80° C. At this time, in the second drying, heating was performed so that the hot air temperature became 80° C. and the temperature of the sheet heater 90 became 80° C. The setting of the hot air temperature and the back surface heating temperature is not limited to this set temperature as long as the print medium P can reach a predetermined temperature. For example, a combination in which the hot air temperature is lower than 80° C. and the temperature of the sheet heater 90 is higher than 80° C. and a combination in which the hot air temperature is higher than 80° C. and the temperature of the sheet heater 90 is lower than 80° C. may be adopted. At this time, the temperature of the gas in the second drying may be controlled to become equal to or lower than the temperature of the gas in the first drying.

[Results]

In the present embodiment, the evaluation content includes glossiness, surface uniformity, and image fastness. The above-described method was used for these evaluations.

TABLE 3

| | FIRST DRYING | | SECOND DRYING | | EVALUATION RESULTS | | |
|---|---|---|---|---|---|---|---|
| | TEMPERATURE T1 | BACK SURFACE HEATING TEMPERATURE | TEMPERATURE T2 | BACK SURFACE HEATING TEMPERATURE | GLOSSINESS | SURFACE UNIFORMITY | IMAGE FASTNESS |
| EXAMPLE 2 | 40° C. | — | 80° C. | — | B | A | B |
| EXAMPLE 7 | 40° C. | — | 80° C. | 80° C. | B | A | A |

Table 3 indicates that Example 7, in which the back surface was heated in the second drying, had almost no change in glossiness and surface uniformity as compared with Example 2, and had a good result in image fastness. This is presumed to indicate that the time required for fixing the image is shortened because the print medium P is efficiently heated.

Fourth Embodiment

In a case where the conveyance speed of the print medium P is different depending on the printing mode, the time of the first drying and the time of the second drying are different. The necessary ink amount and the withstanding temperature limit at which deformation or alteration does not occur vary depending on the type of the print medium P. In consideration of these, the heating temperature and the air blowing speed in the first drying and the second drying may be changed. The apparatus holds the heating time and the air blowing speed corresponding to each print medium P and printing mode as a printing table, and sets them to determined set values. Alternatively, the operator inputs numerical values to determine the heating temperature and the air blowing speed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-108457, filed Jul. 5, 2022, which is hereby incorporated by reference herein in its entirety.

What is claimed is:

1. A printing apparatus comprising:
   a print head that applies ink to a print medium;
   a conveyance unit that conveys the print medium in a conveying direction;
   a first drying means that is disposed downstream relative to the print head in the conveying direction, and dries the ink applied to the print medium by blowing gas such that an angle formed with the conveying direction is a first angle; and
   a second drying means that is disposed downstream relative to the first drying means in the conveying direction, and dries the ink applied to the print medium by blowing gas such that an angle formed with the conveying direction is a second angle different from the first angle.

2. The printing apparatus according to claim 1, wherein the second angle is larger than the first angle.

3. The printing apparatus according to claim 1, wherein a temperature of the gas blown onto the print medium by the second drying means is higher than a temperature of the gas blown onto the print medium by the first drying means.

4. The printing apparatus according to claim 3, wherein the temperature of the gas blown onto the print medium by the first drying means is equal to or higher than a temperature of a gas in a region where the ink is applied to the print medium.

5. The printing apparatus according to claim 1, wherein an air speed of the gas blown onto the print medium by the second drying means is higher than an air speed of the gas blown onto the print medium by the first drying means.

6. The printing apparatus according to claim 1, wherein a quantity of the gas blown onto the print medium by the second drying means is larger than a quantity of the gas blown onto the print medium by the first drying means.

7. The printing apparatus according to claim 1, further comprising a third drying means disposed upstream relative to the first drying means in the conveying direction of the print medium.

8. The printing apparatus according to claim 1, wherein the second drying means includes a heating unit that heats the print medium from a back surface of a surface to which the ink is applied.

9. The printing apparatus according to claim 1, wherein the ink contains a pigment, a water-soluble organic solvent, and a resin that is melted by heat to form a film.

10. The printing apparatus according to claim 9, wherein the print head applies, to the print medium, a treatment liquid that reacts with a color material contained in the ink and a resin to thicken the ink.

11. The printing apparatus according to claim 1, wherein the print medium is made of a material having low ink permeability.

12. The printing apparatus according to claim 1, wherein a temperature of the gas blown onto the print medium by the second drying means is equal to or lower than a withstanding temperature limit of the print medium.

* * * * *